US010862079B2

(12) United States Patent
Li

(10) Patent No.: US 10,862,079 B2
(45) Date of Patent: Dec. 8, 2020

(54) INSULATION PLATE FOR SECONDARY BATTERY AND SECONDARY BATTERY

(71) Applicant: Contemporary Amperex Technology Co., Limited, Ningde (CN)

(72) Inventor: Xiang Li, Ningde (CN)

(73) Assignee: Contemporary Amperex Technology Co., Ltd.

( * ) Notice: Subject to any disclaimer, the term of this patent is extended or adjusted under 35 U.S.C. 154(b) by 171 days.

(21) Appl. No.: 16/058,401

(22) Filed: Aug. 8, 2018

(65) Prior Publication Data

US 2019/0207173 A1  Jul. 4, 2019

(30) Foreign Application Priority Data

Jan. 3, 2018  (CN) .......................... 2018 1 0004917

(51) Int. Cl.
| | |
|---|---|
| *H01M 2/10* | (2006.01) |
| *H01M 2/02* | (2006.01) |
| *H01M 10/0587* | (2010.01) |
| *H01M 10/04* | (2006.01) |
| *H01M 2/18* | (2006.01) |

(52) U.S. Cl.
CPC ......... *H01M 2/0277* (2013.01); *H01M 2/024* (2013.01); *H01M 2/0217* (2013.01); *H01M 2/18* (2013.01); *H01M 10/0431* (2013.01); *H01M 10/0587* (2013.01); H01M 2002/0297 (2013.01); Y02E 60/10 (2013.01); Y02T 10/70 (2013.01)

(58) Field of Classification Search
CPC ....................... H01M 2/0277; H01M 10/0431
See application file for complete search history.

(56) References Cited

U.S. PATENT DOCUMENTS

| | | | |
|---|---|---|---|
| 9,899,641 B2 * | 2/2018 | Shinoda ................ | H01M 2/263 |
| 10,158,101 B2 * | 12/2018 | Minagata ............ | H01M 2/0237 |
| 2015/0004446 A1 * | 1/2015 | Kim .................... | H01M 2/0408 |
| | | | 429/56 |

(Continued)

FOREIGN PATENT DOCUMENTS

| | | |
|---|---|---|
| EP | 2866279 A1 | 4/2015 |
| JP | H0864199 A | 3/1996 |

(Continued)

*Primary Examiner* — Amanda C. Walke
(74) *Attorney, Agent, or Firm* — Forge IP, PLLC

(57) ABSTRACT

The present disclosure relates to an insulation plate for a secondary battery and a secondary battery. The insulation plate includes two side portions and a top portion between the two side portions. Each of the two side portion includes a transverse covering portion and a longitudinal covering portion that are used to cover a transverse transition part and a longitudinal transition part of an electrode assembly of the secondary battery, respectively. During placing the electrode assembly into a case of the secondary battery, since transition parts of the electrode assembly are covered by the insulation plate, the transition parts of the electrode assembly are prevented from directly contacting the case, thereby reducing the possibility of being scratched and rubbed by the opening of the case. Therefore, electrical connection between negative and positive electrode plates of the electrode assembly is avoided and thus the reliability of the secondary battery is improved.

7 Claims, 6 Drawing Sheets

(56) References Cited

U.S. PATENT DOCUMENTS

| | | | | |
|---|---|---|---|---|
| 2015/0171462 A1* | 6/2015 | Hong | ................ | H01M 10/0436 |
| | | | | 429/1 |
| 2016/0336574 A1* | 11/2016 | Guen | ...................... | H01M 2/06 |
| 2017/0133655 A1* | 5/2017 | Guen | ...................... | H01M 2/06 |

FOREIGN PATENT DOCUMENTS

| | | |
|---|---|---|
| JP | 2016115407 A | 6/2016 |
| WO | WO2014048619 A1 | 4/2014 |
| WO | WO2015098517 A1 | 7/2015 |

* cited by examiner

INSULATION PLATE FOR SECONDARY BATTERY AND SECONDARY BATTERY

CROSS-REFERENCE TO RELATED APPLICATIONS

The present application claims priority to Chinese Patent Application No. 201810004917.7, filed on Jan. 3, 2018, the content of which is incorporated herein by reference in its entirety.

TECHNICAL FIELD

The present disclosure relates to the field of energy storage devices, and in particular, to an insulation plate for a secondary battery and a secondary battery.

BACKGROUND

At present, secondary battery, especially lithium ion battery, has been widely used in portable electronic devices such as mobile phones, digital cameras, portable computers, and so on, due to its advantages of high energy density, high power density, long cycle life, long storage life, and the like. The secondary battery also has a broad application prospect in electric vehicle such as electric automobile and electric bicycle, and medium- to large-sized electric equipment such as energy storage device. The secondary battery has become a key of solving global problems, such as energy crisis and environmental pollution.

Insulation between positive and negative electrodes of the secondary battery is worth of concern during both manufacturing and using of the secondary battery. A vehicle battery includes a case and an electrode assembly. The case is a hard metal case and may have burrs formed in stamping. Therefore, a thin separator of the electrode assembly may be scratched and damaged at an opening of the case when the electrode assembly is being placed into the case, thus exposing positive and negative electrode plates of the electrode assembly, or even resulting in a short circuit by overlapping the case. In addition, electrode tabs of the positive and negative electrode plates are thin and easily to be deformed. If the electrode tabs are excessively long, they may overlap the case after the electrode assembly has been amounted in the case, thus causing the short circuit.

SUMMARY

The present disclosure provides an insulation plate for a secondary battery. The insulation plate includes two side portions and a top portion located between the two side portions. Each of the two side portions includes a transverse covering portion and a longitudinal covering portion. The transverse covering portion and the longitudinal covering portion are used to cover a transverse transition part and a longitudinal transition part of an electrode assembly of the secondary battery, respectively.

Optionally, the transverse covering portion of one of the two side portions and the transverse covering portion of the other one of the two side portions are arranged opposite to each other in a thickness direction of the secondary battery and do not overlap; and the longitudinal covering portion of one of the two side portions and the longitudinal covering portion of the other one of the two side portions are arranged opposite to each other in the thickness direction of the secondary battery and do not overlap.

Optionally, the transverse covering portion has a width smaller than a width of the longitudinal covering portion.

Optionally, the transverse covering portion and the longitudinal covering portion of one of the two side portions have an arc transition therebetween.

A second aspect of the present disclosure provides a secondary battery. The secondary battery includes a case, an electrode assembly accommodated in the case, and an insulation plate described above. The electrode assembly includes a transverse transition part and a longitudinal transition part. The insulation plate is accommodated in the case and covers an exterior of the electrode assembly. The insulation plate includes two side portions and a top portion located between the two side portions. Each of the two side portions includes a transverse covering portion and a longitudinal covering portion. The transverse covering portion and the longitudinal covering portion are used to cover a transverse transition part and a longitudinal transition part of an electrode assembly of the secondary battery, respectively.

Optionally, the transverse covering portion of one of the two side portions and the transverse covering portion of the other one of the two side portions are arranged opposite to each other in a thickness direction of the secondary battery and do not overlap; and the longitudinal covering portion of one of the two side portions and the longitudinal covering portion of the other one of the two side portions are arranged opposite to each other in the thickness direction of the secondary battery and do not overlap.

Optionally, the transverse covering portion has a width smaller than a width of the longitudinal covering portion.

Optionally, the electrode assembly includes a side surface facing the longitudinal covering portion and a bottom surface facing the transverse covering portion. A ratio of an area of the side surface uncovered with the longitudinal covering portion to a total area of the side surface is a side surface ratio. A ratio of an area of the bottom surface uncovered with the transverse covering portion to a total area of the bottom surface is a bottom surface ratio. The side surface ratio is smaller than the bottom surface ratio.

Optionally, the transverse covering portion has a width smaller than or equal to $1/7$ of a thickness of the electrode assembly.

Optionally, the case has an inner wall having a quadrate structure, the electrode assembly is in a winded structure and has an arc surface extending longitudinally, the longitudinal covering portion is arranged at a side of the electrode assembly viewed in a thickness direction of the secondary battery and covers a portion of the arc surface.

Optionally, the longitudinal covering portion is arranged at a side of a winding-start layer of the electrode assembly viewed in the thickness direction, and the winding-start layer is an innermost layer of the electrode assembly.

Optionally, the longitudinal covering portion of each of the two side portions has a width smaller than or equal to $1/4$ of a thickness of the electrode assembly.

Optionally, the secondary battery further includes an adhesive tape, and the electrode assembly includes a side surface facing the longitudinal covering portion. The adhesive tape adheres the longitudinal covering portion to the side surface, so as to adhere and fix the longitudinal covering portion of each of the two side portions to the electrode assembly.

Optionally, the secondary battery further includes an adhering film, and the adhering film covers the side surface, the adhesive tape and the insulation plate.

Optionally, each of the two side portions further includes a main covering portion connected to the longitudinal covering portion and the transverse covering portion; the adhesive tape extends from the main covering portion of one of the two side portions, through two longitudinal covering portions of the two side portions to the main covering portion of the other one of the two side portions; and the electrode assembly includes a bottom surface facing the transverse covering portion, and a top surface opposite to the bottom surface; and the adhesive tape is at least arranged at a position close to the top surface and at a position close to the bottom surface.

The technical solutions provided by the present disclosure can achieve the following beneficial effects.

The present disclosure provides the insulation plate including the transverse covering portions and the longitudinal covering portions. The transverse covering portion and the longitudinal covering portion cover a transverse transition part and a longitudinal transition part of an electrode assembly of the secondary battery, respectively, so that the battery assembly is covered by the insulation plate before being placed into the case. In this way, when placing the battery assembly into the case, each transition part of the electrode assembly is protected from directly contacting the case, since each transition part of the electrode assembly is covered by the insulation plate. Therefore, the transition parts of the electrode assembly are prevented from being scratched or rubbed by the opening of the case, and an electrical connection between the positive and negative electrode plates of the electrode assembly is prevented, thereby improving safety performance of the secondary battery.

It should be understood that the above general description and the detailed description below are merely illustrative and are not intended to limit the present disclosure.

REFERENCE SIGNS

10—case;
11—cavity;
20—electrode assembly;
21—transverse transition part;
22—longitudinal transition part;
23—main body surface;
24—side surface;
241—top end;
25—top surface;
26—bottom surface;
27—first electrode plate;
271—winding-start layer;
28—second electrode plate;
29—separator;
30—insulation plate;
31—top portion;
311—hollow region;
32—side portion;
321—transverse covering portion;
322—longitudinal covering portion;
323—transverse crease;
324—longitudinal crease;
325—top crease;
326—main covering portion;
40—top cover;
50—adhesive tape.

The accompany drawings herein are incorporated into the specification and constitute a part of the specification for illustrating embodiments of the present disclosure and explaining principles of the present disclosure together with the description.

DESCRIPTION OF EMBODIMENTS

The present disclosure is further described in detail with reference to following embodiments in combination of the accompany drawings.

Figure 6:
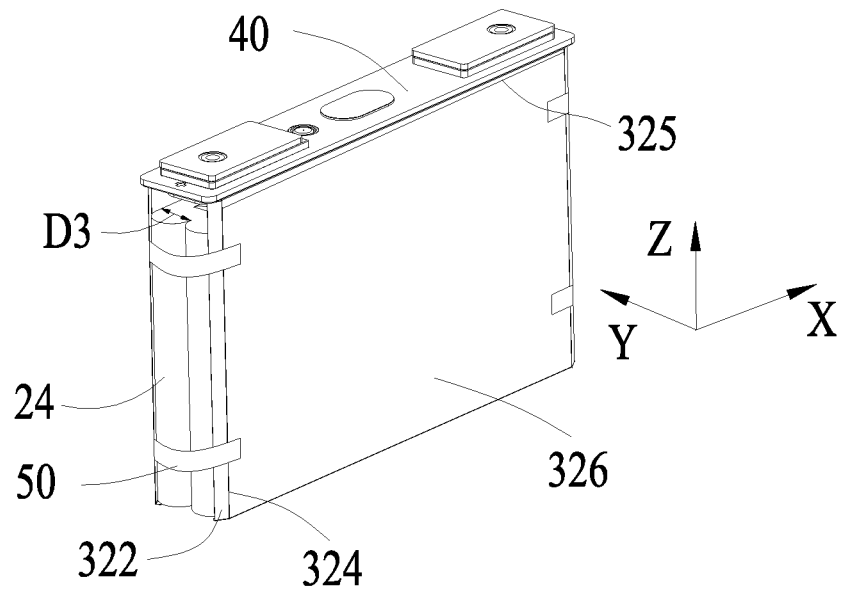
FIG. 6 is an axonometric diagram observed from a viewing angle of two electrode assemblies after being covered with an insulation plate according to an embodiment of the present disclosure.
Figure 7:
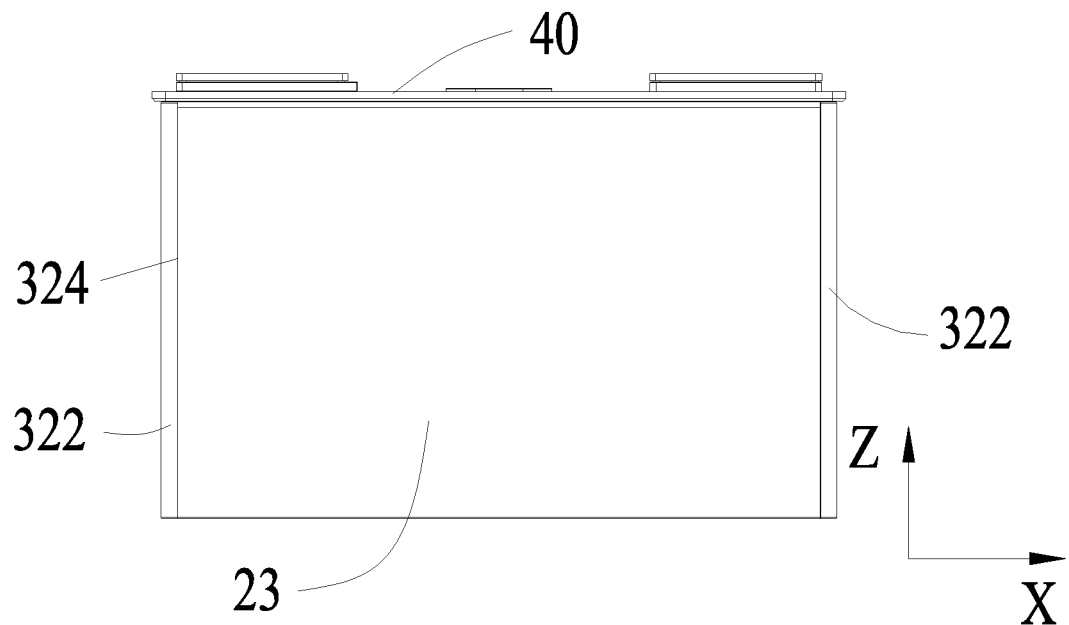
FIG. 7 is a front view of two electrode assemblies after being covered with an insulation plate according to an embodiment of the present disclosure.

The following description is based on a placement manner of a battery as shown in FIG. 6. Referring to FIG. 6, a height direction of the secondary battery is referred to as a height direction Z, a length direction of the secondary battery is referred to as a length direction X, and a thickness direction of the secondary battery is referred to as a thickness direction Y.

As shown in FIGS. 1-9, the embodiments of the present disclosure provide a secondary battery. The secondary battery includes a case 10, a top cover 40, an electrode assembly 20, and an insulation plate 30. The electrode assembly 20 is accommodated in the case 10. The insulation plate 30 covers exterior of the electrode assembly 20 and is accommodated in the case 10. The top cover 40 covers and closes the case 10 so as to encapsulate the electrode assembly 20 and the insulation plate 30 in the case 10.

As shown in FIGS. 3-9, the insulation plate 30 includes a top portion 31 and two side portions 32, and the top portion 31 is located between the two side portions 32. Each of the two side portions 32 includes a transverse covering portion 321 and longitudinal covering portions 322. The transverse covering portion 321 and the longitudinal covering portion 322 are used to cover transverse transition parts 21 and longitudinal transition parts 22 of the electrode assembly 20, respectively. That is, in a state in which the insulation plate 30 covers the electrode assembly 20, the transverse covering portions 321 cover the transverse transition parts 21 and the longitudinal covering portions 322 cover the longitudinal transition parts 22.

Based on the insulation plate 30 including the transverse covering portions 321 and the longitudinal covering portions 322, when assembling the battery, the insulation plate 30 is firstly fixed to a side of the top cover 40, then the insulation plate 30 is bent to cover the electrode assembly 20 in such manner that each of the transverse covering portions 321 covers a transverse transition part 21 of the electrode assembly 20 and each of the longitudinal covering portions 322 covers a longitudinal transition part 22 of the electrode assembly 20. After the electrode assembly 20 is placed in the case 10, since all of the transition parts of the electrode assembly 20 are covered by the insulation plate 30, the transition parts of the electrode assembly 20 are prevented from directly contacting the case 10 and protected from being scratched or rubbed by the opening of the case 10 as much as possible. Therefore, an electrical connection between the positive and negative electrode plates of the electrode assembly 20 is prevented, thereby improving safety performance of the secondary battery.

Figure 1:
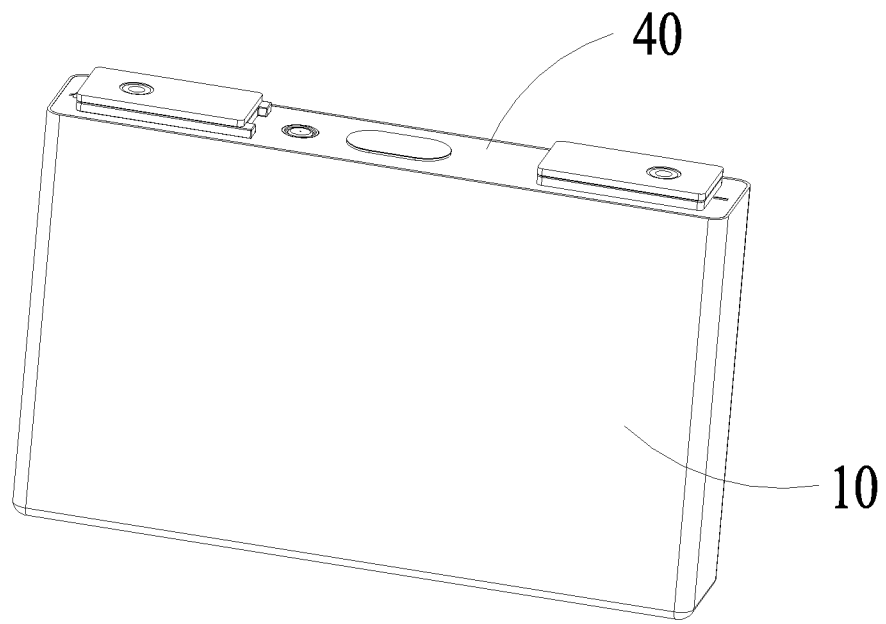
FIG. 1 is a structural schematic diagram of a secondary battery according to an embodiment of the present disclosure.
Figure 2:
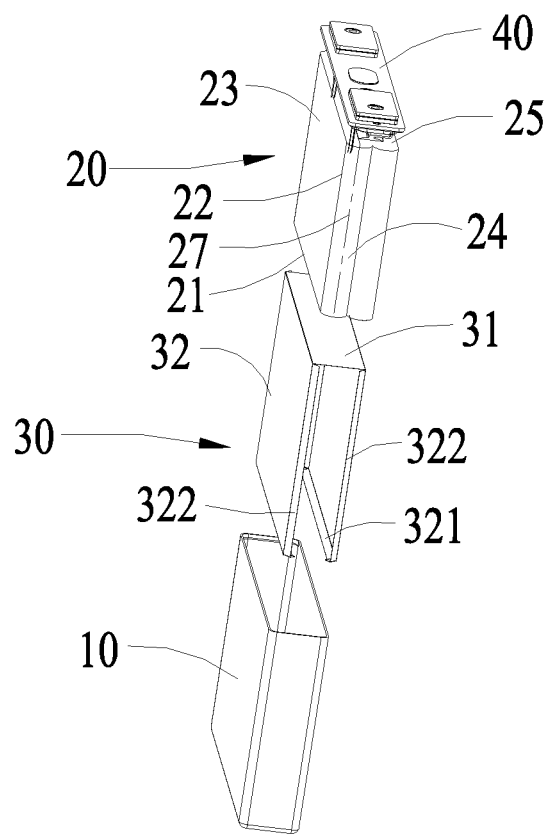
FIG. 2 is an exploded view of a secondary battery according to an embodiment of the present disclosure.

The longitudinal transition part 22 is an arc transition part of the electrode assembly 20, which is located between the main body surface 23 and the side surface 24 and extends along the height direction Z. The transverse transition part 21 is an transition part of the electrode assembly 20, which is located between the main body surface 23 and the bottom surface 26 and extends along the length direction X. As shown in FIG. 2, the electrode assembly 20 includes two main body surfaces arranged opposite to each other in the thickness direction Y, two side surfaces 24 that connect the two main body surfaces 23, a top surface 25 that connects the main body surfaces 23 and the side surfaces 24, and a bottom surface 26 opposite to the top surface 25 in the height direction Z. An intersection between each of the two main body surfaces 23 and the bottom surface 26 forms the transverse transition part 21, and an intersection between each of the two main body surfaces 23 and each of the two side surfaces 24 forms the longitudinal transition part 22. Accordingly, after the insulation plate 30 covers the electrode assembly 20, as shown in FIGS. 3-9, the longitudinal covering portion 322 faces the side surface 24 of the electrode assembly 20, the transverse covering portion 321 faces the bottom surface 26 of the electrode assembly 20. That is, the transverse covering portion 321 of the insulation plate 30 is arranged along the length direction X, and the longitudinal covering portion 322 of the insulation plate 30 is arranged along the height direction Z.

Figure 9:
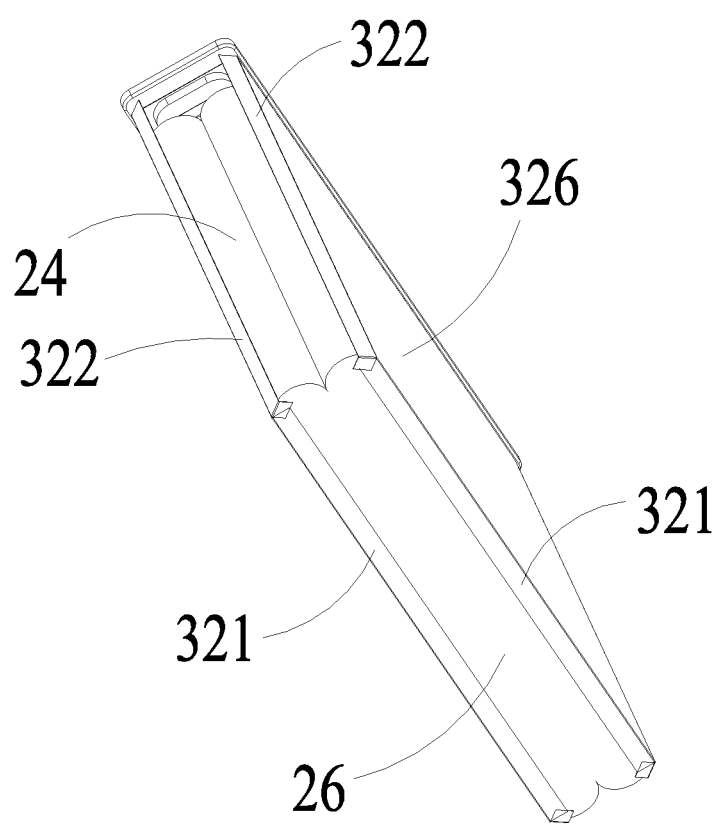
FIG. 9 an axonometric diagram observed from another viewing angle of two electrode assemblies after being covered with an insulation plate according to an embodiment of the present disclosure.

One or more the electrode assembly 20 may be provided. As shown in FIG. 9, two electrode assemblies 20 are provided, the insulation plate 30 covers the two electrode assemblies 20 together, the longitudinal covering portions 322 of the insulation plate 30 covers the outermost longitudinal transition parts 22 of the two electrode assemblies 20, and the transverse covering portions 321 of the insulation plate 30 cover the outermost transverse transition parts 21 of the two electrode assemblies 20.

Figure 5:
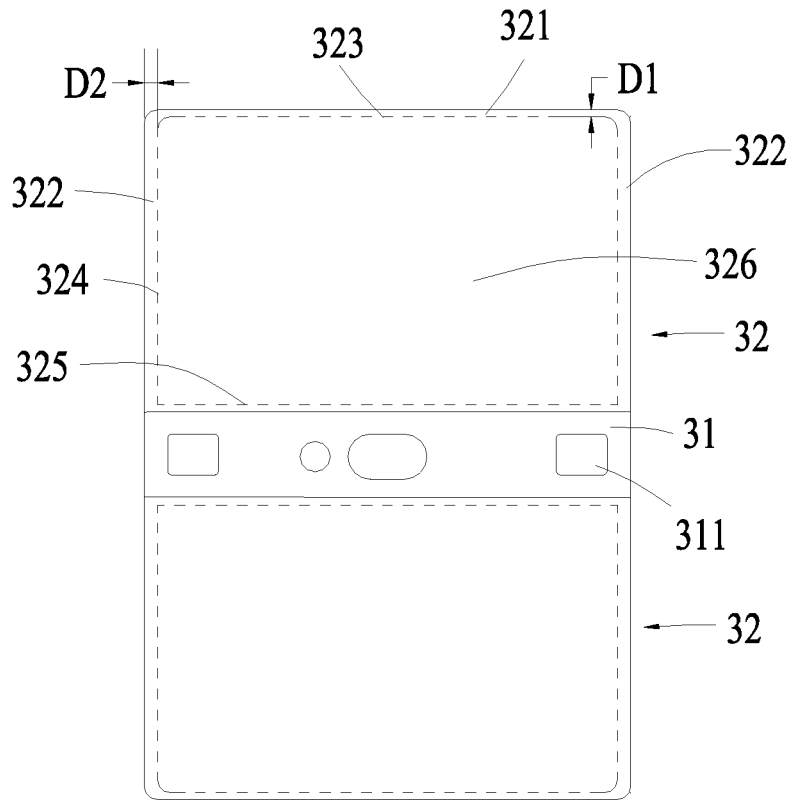
FIG. 5 is a plane diagram of an insulation plate in a flattened state according to an embodiment of the present disclosure.

It can be understood that the insulation plate 30 has an unbent state and a covering state. FIG. 5 is a structural schematic diagram of the insulation plate 30 in the unbent state. FIGS. 6-9 are structural schematic diagrams of the insulation plate 30 in the covering state. As shown in FIGS. 6-9, each of the two side portions 32 is bent along a transverse crease 323 to form a transverse covering portion 321, and also bent along a longitudinal crease 324 to form a longitudinal covering portion 322.

Optionally, the top portion 31 is connected to the two the side portions 32, and the insulation plate 30 in the unbent state has an approximately rectangular form, as shown in FIG. 5. With such structure, a base material can be directly cut along two directions to form the insulation plate 30, without forming additional recesses and the like. Therefore, it is easier to manufactured and costs lower than an irregular shape.

When the insulation plate 30 covers the electrode assembly 20, the top portion 31 of the insulation plate 30 covers the top surface 25 of the electrode assembly 20, i.e., the top portion 31 is located between the top cover 40 and the electrode assembly 20. In order to cover the electrode assembly 20 by the insulation plate 30, the side portion 32 of the insulation plate 30 can be bent along the top crease 325 so as to cover the main body surface 23 of the electrode assembly 20. That is, each side portion 32 further includes a main covering portion 326, the main covering portion 326 connects the longitudinal covering portions 322 and the transverse covering portions 321, and the main covering portion 326 covers the main body surface 23 of the electrode assembly 20.

It should be noted that the top portion 31 is provided with hollow regions 311, as shown in FIG. 5. The hollow regions 311 correspond to an injection hole, a hole for an explosion-proof valve, and through holes for electrode terminals on the top cover 40.

Each side portion 32 includes two longitudinal covering portions 322 for covering the transverse transition part 21 and the longitudinal transition parts 22 of the electrode assembly 20.

In an embodiment, when the insulation plate 30 is covering the electrode assembly 20, in the thickness direction Y, two longitudinal covering portions 322 have an overlapping area, and two transverse covering portions 321 have an overlapping area. That is, in the thickness direction, two longitudinal covering portions 322 at a same side of the electrode assembly 20 viewed in the thickness direction Y are stacked, and two transverse covering portions 321 at a same side of the electrode assembly 20 are stacked. In this way, when an unity is formed by covering the electrode assembly 20 with the insulation plate 30, compared with the electrode assembly 20, a thickness of the unity in the length direction X increases by four times a thickness of the insulation plate 30, and a thickness of the unity in the height direction Z increases by two times the thickness of the insulation plate 30. In this way, the energy density of the secondary battery may be reduced.

Figure 3:
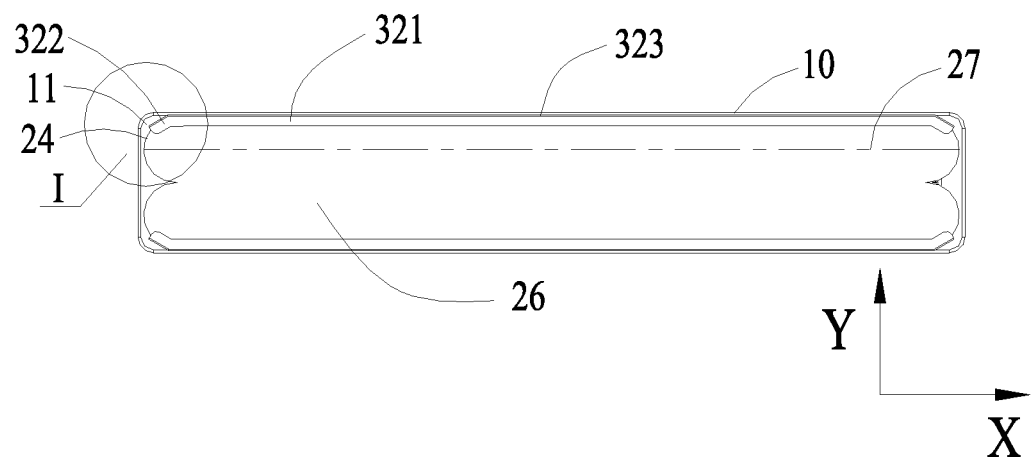
FIG. 3 is a cross-sectional diagram of two electrode assemblies covered with an insulation plate according to an embodiment of the present disclosure and being placed in a case.
Figure 8:
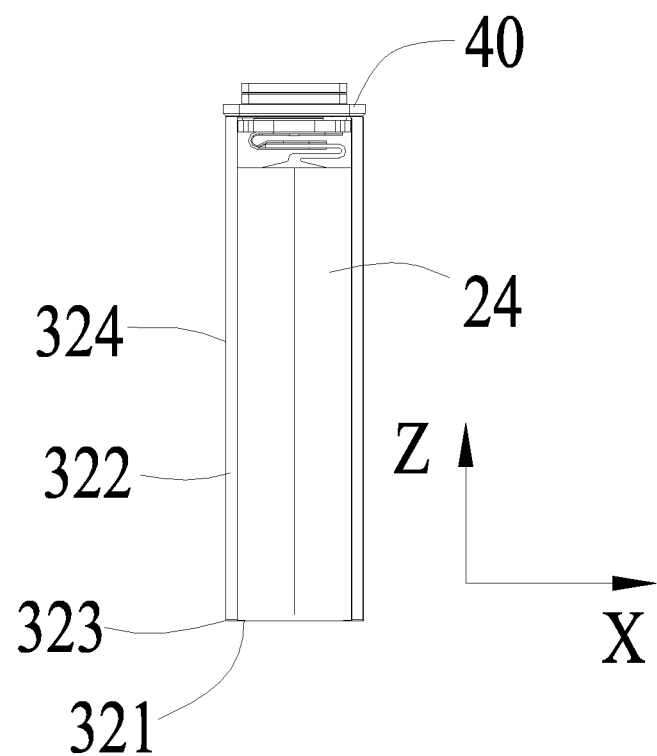
FIG. 8 is a side view of two electrode assemblies after being covered with an insulation plate according to an embodiment of the present disclosure.

In the embodiments of the present disclosure, the two transverse covering portions 321 of the two side portions 32 of the insulation plate 30 are opposite to each other in the thickness direction Y and do not overlap, as shown in FIG. 3. Every two longitudinal covering portions 322 of the two side portions 32 are arranged opposite to each other in the thickness direction Y and do not overlap, as shown in FIG. 8. That is, the two the transverse covering portions 321 have no overlapping area, and the two longitudinal covering portions 322 at the same side of the electrode assembly 20 also have no overlapping area, as shown in FIG. 9. In addition, a width D1 of each transverse covering portion 321 is smaller than a width D2 of each longitudinal covering portion 322, as shown in FIG. 5. The width herein refers to a size in the thickness direction Y after the secondary battery is assembled. In this way, when the unity is formed by covering the electrode assembly 20 with the insulation plate 30, compared with the electrode assembly 20, the thickness of the unity in the length direction X of the secondary battery only increases by two times the thickness of the insulation plate 30, and the thickness of the unity in the height direction Z only increases by one time the thickness of the insulation plate 30. In this way, the insulation plate 30 occupies less inner space of the secondary battery, and thus the energy density of the secondary battery is improved. Since the two transverse covering portions 321 are arranged opposite to each other, after the electrode assembly 20 is amounted in the case 10, the electrolyte solution in the secondary battery can flow through a gap between the two transverse covering portions 321, and can flow directly from outside of the insulation plate 30, through the gap between the two transverse covering portions 321 of the insulation plate 30, and goes into the electrode assembly 20, so that the electrolyte can enter the electrode assembly 20 easier. Therefore, the wetting degree of the electrolyte to the positive and negative electrode plates is improved, and the electrochemical performance of the secondary battery is improved. That is, the energy density and electrochemical performance of the secondary battery are improved, in addition to solving scratching and rubbing problems when the electrode assembly is being placed into the case 10. Moreover, when the electrode assembly 20 is being placed into the case 10, the transverse transition parts 21 firstly enter the opening of the case 10, and then do not contact the opening any longer, while the longitudinal transition parts 22 keep contacting the opening during placing the electrode assembly 20 into the case 10. Therefore, the longitudinal transition parts 22 are more likely to be scratched and rubbed, while the transverse transition parts 21 are less likely to be scratched or rubbed when compared with the longitudinal transition parts 22. In addition, if the longitudinal transition parts 22 are scratched or rubbed, the generated burrs would keep contacting other components such as the case 10 during the whole process of placing the electrode assembly 20 into the case 10, which can cause different degrees of deformation and severe damage to the electrode assembly 20, thus causing unpredictable hazards. According to the embodiments of the present disclosure, it is set that the width D1 of the transverse covering portion 321 is smaller than the width of the longitudinal covering portion 322, such that the longitudinal covering portion 322 has a sufficiently wide covering area. Therefore, even if the electrode assembly keeps being touched by the opening, the longitudinal transition parts 22 would not be exposed, i.e., the electrode assembly 20 is reliably covered by the insulation plate 30 during the whole process of placing the electrode assembly 20 into the case 10, thereby improving the safety performance of the secondary battery.

Further, the gap between the two transverse covering portions 321 provides a path for the electrolyte entering the electrode assembly 20. That is, the electrolyte can flow into the electrode assembly through the gap. This reduces the difficulty of the electrolyte contacting the electrode assembly 20 and allows the electrolyte to fully wet the positive and negative electrode plates of the electrode assembly, so that the secondary battery can have an improved electrochemical performance.

If the two longitudinal covering portions 322 at the same side of the electrode assembly contact with one another with their transition parts, but do not overlap, there would be high demands on the edges of the insulation plate 30, which can increase manufacturing cost of the insulation plate 30 and the material used for producing the insulation plate 30. In the embodiments of the present disclosure, there is a gap between the two longitudinal covering portions 322 at the same side of the electrode assembly. In this way, even if the edges of the insulation plate 30 are jagged, the two side portions 32 of the insulation plate 30 do not affect each other.

Optionally, after the insulation plate 30 covers the electrode assembly 20, the side surfaces 24 are partially uncovered with the insulation plate 30, and the bottom surface 26 is partially uncovered with the insulation plate 30. A ratio of an uncovered area of the side surfaces 24 to a total area of the side surfaces 24 is referred to as a side surface ratio, and a ratio of an uncovered area of the bottom surface 26 to a total area of the bottom surface 26 is referred to as a bottom surface ratio. The side surface ratio is smaller than the bottom surface ratio. That is, the uncovered area of the side surfaces 24 relative to the total area of the side surfaces 24 is smaller, thereby further preventing the longitudinal transition parts 22 from being scratched or rubbed during placing the electrode assembly 20 into the case 10.

As shown in FIGS. 5-6, the width D1 of the transverse covering portion 321 is smaller than or equal to ½ the thickness D3 of the electrode assembly 20, e.g., $D1=\frac{1}{7}D3$, $D1=\frac{1}{8}D3$, or $D1=\frac{1}{9}D3$. This can guarantee that the electrode assembly 20 will not be scratched or rubbed after the insulation plate 30 covers the transverse transition parts 21, and allow the uncovered area of the bottom surface 26 of the electrode assembly 20 to be as large as possible, which is large enough for the electrolyte to enter the electrode assembly 20 and to fully wet the positive and negative electrode plates, thereby improving the electrochemical performance of the secondary battery.

Figure 4:
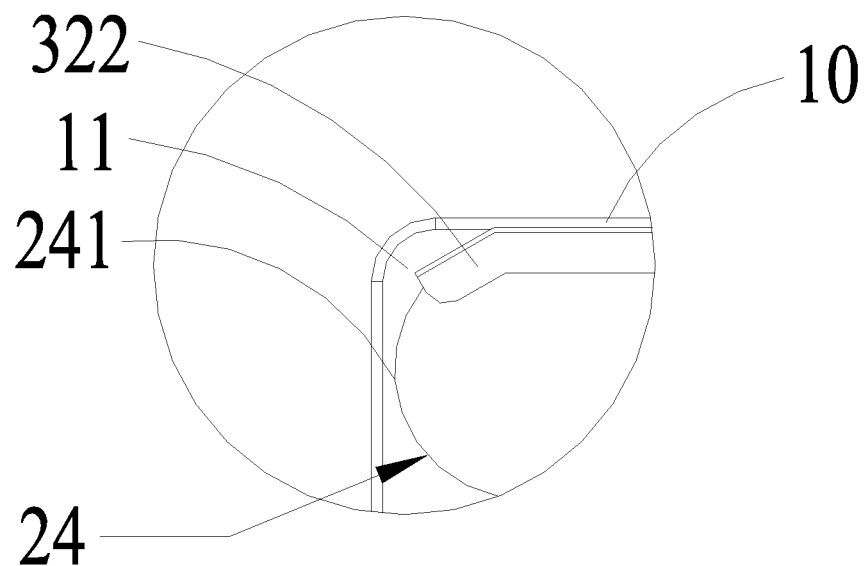
FIG. 4 is an enlarged view of a partial portion I in FIG. 3.
Figure 10:
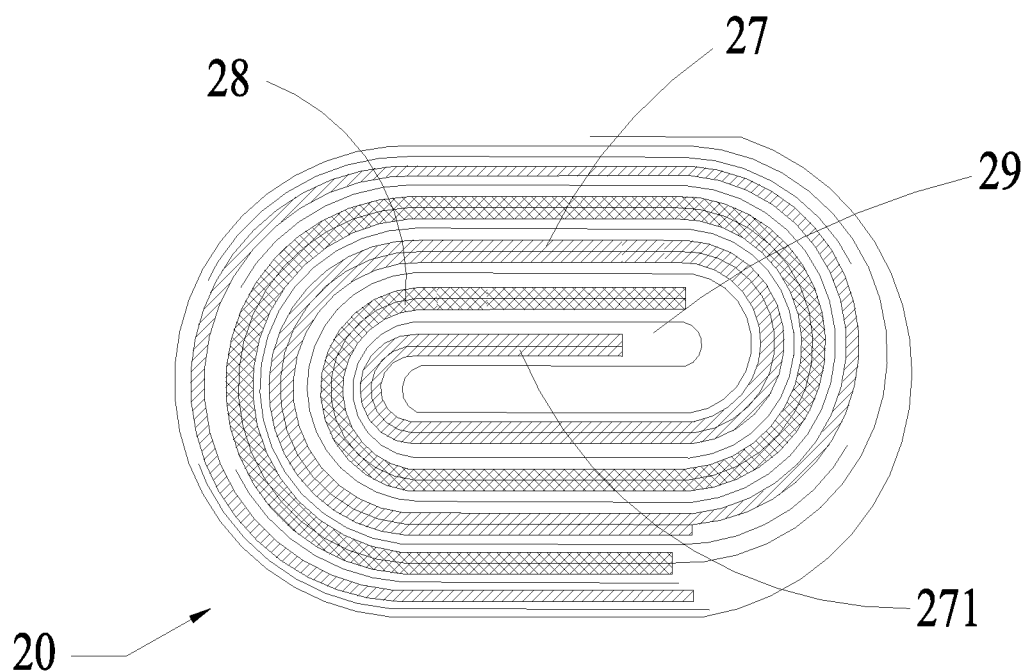
FIG. 10 is a cross-sectional view of an electrode assembly in a secondary battery according to an embodiment of the present disclosure.

It can be understood that an inner wall of the case 10 is a quadrate structure. That is, the inner wall of the case 10 includes two narrow side surfaces that face the two side surfaces 24 of the electrode assembly 20, and two wide side surfaces that face the main covering portions 326. The two narrow side surfaces and the two wide side surfaces form the quadrate structure. Each narrow side surface and each wide side surfaces are connected and form an orthogonal corner or a rounded corner The electrode assembly 20 can be a winded structure having an arc surfaces extending longitudinally. In other words, the electrode assembly 20 is formed by winding; and as shown in FIG. 3, the side surfaces 24 of the electrode assembly 20 are arc surfaces, each longitudinal covering portion 322 covers a portion of one arc surface of the electrode assembly 20 and is arranged at one side of the electrode assembly 20 viewed in the thickness direction Y. Preferably, each longitudinal covering portion 322 covers a portion of one arc surface of the electrode assembly 20 and is arranged at a side of a winding-start layer of the electrode assembly 20 viewed in the thickness direction Y, as shown in FIG. 3. After the electrode assembly 20 is placed in the case 10, a cavity 11 is formed between the arc surfaces and the case 10, as shown in FIGS. 3-4. Since each longitudinal covering portion 322 covers a portion of one arc surface of the electrode assembly 20 and is arranged at a side of the electrode assembly 20 viewed in the thickness direction, then the longitudinal covering portions 322 are located in the cavity 11, and does not occupy space between the electrode assembly 20 and the narrow side surfaces of the case 10 in the length direction X (especially an area of the arc surface closest to the narrow side surfaces of the case 10). In other words, compared with a conventional insulation plate (in which the two longitudinal covering portions 322 at the same side of the electrode assembly overlap each other, i.e., the longitudinal covering portions 322 on at least one side may extend along the thickness direction Y and beyond the straight line where the winding-start layer of the electrode assembly 20 is located), there is a larger gap between the arc surface of the electrode assembly 20 and the narrow side surface of the case 10 when using the insulation plate of the present disclosure, and thus there will be a larger space that can allow the electrode assembly 20 to expand in the length direction X. Therefore, the arc surfaces of the expanded electrode assembly 20 (especially the area of the arc surface closest to the narrow side surface of the case 10) will not excessively press the narrow side surfaces of the case 10, and thus will not bear a great counterforce, thereby preventing the electrode plate (the positive electrode plate or the negative electrode plate) from being broken at the arc surfaces. The winding-start layer is an innermost layer where the electrode assembly 20 start winding. As shown in FIG. 10, the electrode assembly is composed of a first electrode plate 27, a second electrode plate 28 and a separator 29 arranged between the first electrode plate 27 and the second electrode plate 28. The innermost layer of the electrode assembly 20 is the winding-start layer 271 of the first electrode plate 27, and the winding-start layer 271 is not provided with an electrode tab. In some embodiments, the first electrode plate 27 is the positive electrode plate, and the second electrode plate 28 is the negative electrode plate. In some other embodiments, the first electrode plate 27 is the negative electrode plate, and the second electrode plate 28 is the positive electrode plate. Preferably, the width of the longitudinal covering portion 322 is smaller than or equal to ¼ the thickness of the electrode assembly 20.

It is can be understood that a top end 241 of the arc surface in the length direction X is closest to the case 10. If the longitudinal covering portion 322 extend toward the top end 241, then an edge of the longitudinal covering portion 322 would form a fin, such that the edge of the longitudinal covering portion 322 would be easily warped or even wrinkled when the electrode assembly 20 is being placed into the case 10. This can increase the size of the unity formed by the electrode assembly 20 and the insulation plate 30 and reduce the energy density of the secondary battery. In order to solve such problem, as shown in FIGS. 5-6, the width D2 of each of the two longitudinal covering portions 322 is set to be smaller than or equal to ¼ the thickness D3 of the electrode assembly 20, e.g., D2=¼D3, D2=⅕D3, or D2=⅙D3.

In an embodiment, as shown in FIG. 5, the transverse covering portion 321 and the longitudinal covering portion 322 in one side portion 32 form an arc transition therebetween. As shown in FIG. 9, after the insulation plate 30 covers the electrode assembly 20, the longitudinal covering portion 322 and the transverse covering portion 321 form a folded structure at the bottom surface 26 of the electrode assembly 20, the arc transition of the transverse covering portion 321 and the longitudinal covering portion 322 can reduce a folded area thereof, and thus the insulation plate 30 can be fixed at the bottom surface 26 easier.

The insulation plate 30 is in a covering state after covering the electrode assembly 20 but tends to be flattened. When placing the electrode assembly 20 into the case 10, the longitudinal covering portion 322 is much more likely to contact the case 10, which may result in that the longitudinal covering portion to be warped or even wrinkled. In an embodiment, the secondary battery further includes an adhesive tape 50. The adhesive tape 50 can adhere the longitudinal covering portions 322 to the side surfaces 24 of the electrode assembly 20, so as to adhere and fix the longitudinal covering portions 322 of the two the side portion 32 to the electrode assembly 20, as shown in FIG. 6. In this way, the insulation plate 30 is prevented as much as possible from being flattened when the electrode assembly 20 is being placed into the case 10, thereby avoiding warping and wrinkling of the longitudinal covering portions 322.

For example, the adhesive tape 50 extends from one main covering portion 326, through two longitudinal covering portions 322 to another main covering portion 326. That is, the adhesive tape 50 extends round one side surface 24 of the electrode assembly 20, thus can better fix the longitudinal covering portions 322 with the electrode assembly 20, and prevents the longitudinal covering portion 322 from being warped or wrinkled during placing the electrode assembly 20 into the case 10.

The number of the adhesive tape 50 can be one or more than one. When the number of the adhesive tape 50 is more than one, then the adhesive tapes 50 are at least arranged at two positions, e.g., a position close to the top surface 25 of the electrode assembly 20 and a position close to the bottom surface 26 of the electrode assembly 20. The side portion 32 and the top portion 31 of the insulation plate 30 are bent at the position close to the top surface 25, and the transverse covering portion 321 and the longitudinal covering portion 322 are connected to each other at the position close to the bottom surface 26. Therefore, the insulation plate 30 is more likely to be flattened at these two positions than at other positions, so that arranging the adhesive tape 50 at these two positions can better fix the insulation plate 30.

Further, the secondary battery may further include an adhering film (not shown). The adhering film covers the side surfaces, the adhesive tape 50 and the insulation plate 30, i.e., the adhering film covers the insulation plate 30 along a circumferential direction by extending from one side surface 24, through one main body surface 23 and another side surface 24, to another main body surface 23 of the electrode assembly 20. The adhering film may further cover the bottom surface 26 of the electrode assembly 20. In this way, the electrode assembly 20 and the insulation plate 30 form the unity, thereby protecting the insulation plate 30 from being warped and wrinkled when being placed into the case, and further better guaranteeing intactness and safety performance of the electrode assembly 20.

When the bottom surface 26 is provided with the adhering film, a plurality of holes can be arranged on the adhering film for providing paths for the electrolyte entering the electrode assembly 20, such that the electrolyte can better wet the positive and negative electrode plates.

The present disclosure further provides a vehicle including the secondary battery according to any of the above embodiments.

The above embodiments of the present disclosure are merely illustrative, but are not used to limit the present disclosure. Those skilled in the art may make any possible change and modification without departing from the concept of the present disclosure. Any modification, equivalent substitution, improvement, etc. within the principles of the present disclosure shall fall into the protection scope of the present disclosure.

What is claimed is:

1. A secondary battery, comprising:
   a case;
   an electrode assembly accommodated in the case, wherein the electrode assembly comprises a transverse transition part and a longitudinal transition part; and
   an insulation plate, wherein the insulation plate is accommodated in the case and covers an exterior of the electrode assembly,
   wherein the insulation plate comprises:
   two side portions, wherein each of the two side portions comprises a transverse covering portion and a longitudinal covering portion, the transverse covering portion and the longitudinal covering portion cover a transverse transition part and a longitudinal transition part of an electrode assembly of the secondary battery, respectively; and a top portion located between the two side portions, wherein the transverse covering portion of one of the two side portions and the transverse covering portion of the other one of the two side portions are arranged opposite to each other in a thickness direction of the secondary battery and do not overlap, wherein the longitudinal covering portion of one of the two side portions and the longitudinal covering portion of the other one of the two side portions are arranged opposite to each other in the thickness direction of the secondary battery and do not overlap, wherein the electrode assembly comprises a side surface facing the longitudinal covering portion and a bottom surface facing the transverse covering portion, wherein a ratio of an area of the side surface uncovered with the longitudinal covering portion to a total area of the side surface is a side surface ratio, a ratio of an area of the bottom surface uncovered with the transverse covering portion to a total area of the bottom surface is a bottom surface ratio, and wherein the side surface ratio is smaller than the bottom surface ratio.

2. The secondary battery according to claim 1, wherein the transverse covering portion has a width smaller than a width of the longitudinal covering portion.

3. The secondary battery according to claim 1, wherein the transverse covering portion has a width smaller than or equal to ⅐ of a thickness of the electrode assembly.

4. A secondary battery, comprising:

a case;

an electrode assembly accommodated in the case, wherein the electrode assembly comprises a transverse transition part and a longitudinal transition part; and an insulation plate, wherein the insulation plate is accommodated in the case and covers an exterior of the electrode assembly, wherein the insulation plate comprises:

two side portions, wherein each of the two side portions comprises a transverse covering portion and a longitudinal covering portion, the transverse covering portion and the longitudinal covering portion cover a transverse transition part and a longitudinal transition part of an electrode assembly of the secondary battery, respectively; and a top portion located between the two side portions, wherein the case has an inner wall having a quadrate structure, the electrode assembly is in a winded structure and has an arc surface extending longitudinally, the longitudinal covering portion is arranged at a side of the electrode assembly viewed in a thickness direction of the secondary battery and covers a portion of the arc surface, wherein the longitudinal covering portion is arranged at a side of a winding-start layer of the electrode assembly viewed in the thickness direction, and wherein the winding-start layer is an innermost layer of the electrode assembly.

5. The secondary battery according to claim 4, wherein the longitudinal covering portion of each of the two side portions has a width smaller than or equal to ¼ of a thickness of the electrode assembly.

6. A secondary battery, comprising:

a case;

an electrode assembly accommodated in the case, wherein the electrode assembly comprises a transverse transition part and a longitudinal transition part;

an insulation plate, wherein the insulation plate is accommodated in the case and covers an exterior of the electrode assembly, and an adhesive tape, wherein the insulation plate comprises:

two side portions, wherein each of the two side portions comprises a transverse covering portion and a longitudinal covering portion, the transverse covering portion and the longitudinal covering portion cover a transverse transition part and a longitudinal transition part of an electrode assembly of the secondary battery, respectively; and a top portion located between the two side portions, wherein the electrode assembly comprises a side surface facing the longitudinal covering portion, the adhesive tape adheres the longitudinal covering portion to the side surface, so as to adhere and fix the longitudinal covering portion of each of the two side portions to the electrode assembly, and wherein the secondary battery further comprises an adhering film, and the adhering film covers the side surface, the adhesive tape and the insulation plate.

7. The secondary battery according to claim 6, wherein each of the two side portions further comprises a main covering portion connected to the longitudinal covering portion and the transverse covering portion, wherein the adhesive tape extends from the main covering portion of one of the two side portions, through two longitudinal covering portions of the two side portions to the main covering portion of the other one of the two side portions, wherein the electrode assembly comprises a bottom surface facing the transverse covering portion, and a top surface opposite to the bottom surface, and wherein the adhesive tape is at least arranged at a position close to the top surface and at a position close to the bottom surface.

* * * * *